United States Patent [19]
Everett et al.

[11] Patent Number: 5,849,858
[45] Date of Patent: Dec. 15, 1998

[54] RESINOUS BINDER COMPOSITIONS

[75] Inventors: George S. Everett, Claredon Hills, Ill.; George R. MacLennan, West Lafayette; Michael C. Chen, Lafayett, both of Ind.

[73] Assignee: QO Chemicals, Inc., West Lafayette, Ind.

[21] Appl. No.: 54,297

[22] Filed: Apr. 2, 1998

Related U.S. Application Data

[60] Division of Ser. No. 437,169, May 8, 1995, Pat. No. 5,741,914, which is a continuation-in-part of Ser. No. 176,341, Dec. 29, 1993, abandoned, which is a continuation-in-part of Ser. No. 12,359, Feb. 2, 1993, abandoned.

[51] Int. Cl.⁶ ..................................................... C08G 2/00
[52] U.S. Cl. ..................... 528/230; 528/232; 528/247; 528/248; 528/249; 528/250; 124/111; 124/549; 149/497; 149/502
[58] Field of Search ..................................... 528/230, 232, 528/247, 248, 249, 250; 524/111, 549; 549/497, 502

[56] References Cited

U.S. PATENT DOCUMENTS

| | | | |
|---|---|---|---|
| 3,681,420 | 8/1972 | Brown et al. | 549/214 |
| 4,439,568 | 3/1984 | Bogner | 524/111 |
| 4,451,577 | 5/1984 | Coss | 502/167 |
| 4,543,373 | 9/1985 | Kawiec et al. | 524/549 |
| 4,694,905 | 9/1987 | Armbruster | 166/280 |

FOREIGN PATENT DOCUMENTS

| | | |
|---|---|---|
| 1200336 | 2/1986 | Canada . |
| 109710 | 4/1978 | Poland . |

*Primary Examiner*—Duc Truong
*Attorney, Agent, or Firm*—Woodard, Emhardt, Naughton, Moriarty & McNett

[57] ABSTRACT

Furfuryl alcohol/formaldehyde resins exhibiting high water compatibility and low amounts of volatile organic compounds such as furfuryl alcohol.

15 Claims, No Drawings

RESINOUS BINDER COMPOSITIONS

This application is a divisional application of application Ser. No. 08/437,169, filed May 8, 1995, now U.S. Pat. No. 5,741,914 which is a continuation-in-part of application Ser. No. 08/176,341 filed Dec. 29, 1993 (abandoned), which is a continuation-in-part of application Ser. No. 08/012,359 filed Feb. 2, 1993 (abandoned).

This invention relates to reaction products of furfuryl alcohol and formaldehyde and more particularly to resinous furfuryl alcohol-formaldehyde reaction products having advantageous properties which admirably suit them for use as binders for composite articles.

Canadian Patent No. 1,200,336 relates to resinous furan-formaldehyde condensation products which can be diluted with water in amounts up to about 50% by weight and which when cured or set are useful as binders in the manufacture of composite articles such as wood particle boards, or to form insulation batting from glass fibers, wafer board, oriented fiber board, matboard, hardboard, pressboard, various fiberglass articles and the like, and in the manufacture of low density non-molded composite articles such as acoustical tile and thermal insulating mats or boards.

The invention disclosed in the Canadian patent referred to above was a significant contribution to the art in providing resinous binder compositions which can be diluted with up to 50% by weight water so as to facilitate application, such as by spray means, in manufacturing composite articles. However, resinous binder compositions which exhibit a significantly higher degree of compatibility with water are highly desired in the art of manufacturing composite materials. Furthermore, recent environmental concerns have created the need for resinous binders which are not only highly compatible with water but at the same time contain very low levels of furfuryl alcohol and formaldehyde and which emit only very low levels of volatile organic compounds (VOC) at room termperature or at elevated curing temperatures.

Accordingly, it is a principal object of the invention to provide resinous furfuryl alcohol-formaldehyde reaction products having a combination of highly desirable properties and which render the compositions highly advantageous as binders for composite articles.

It is a further object of the invention to provide liquid resinous compositions comprising the reaction product of furfuryl alcohol and formaldehyde which cure rapidly to a rigid set condition at relatively low curing temperatures and which generate very low levels of volatile organic compounds at room temperature or during heat curing.

It is a still further object of the invention to provide resinous heat-curable compositions comprising the reaction product of furfuryl alcohol and formaldehyde which compositions can be used to replace phenolic resole and novolak resins in applications in which such resins are widely used.

It is a still further object of the invention to provide resinous heat-curable compositions comprising the reaction product of furfuryl alcohol and formaldehyde which compositions contain low levels of materials insoluble in water.

It is another object of the invention to provide resinous heat-curable compositions comprising the reaction product of furfuryl alcohol and formaldehyde having low levels of free furfuryl alcohol and formaldehyde and which cure rapidly to a set condition in aqueous environments.

It is still another object of the invention to provide resinous heat-curable compositions comprising the reaction product of furfuryl alcohol and formaldehyde which compositions are highly compatible or dilutable with water to facilitate application as a binder, such as by spraying, in the manufacture of composite articles.

Another object of the invention is to provide liquid resinous heat-curable compositions which contain low amounts of water-insoluble solids so as to minimize deleterious plugging of spray equipment used in application of the compositions as a binder for composite articles.

The new advantageous resinous binder compositions of the invention are prepared by reacting furfuryl alcohol with an excess of formaldehyde, such excess being on the order of at least 2 moles of formaldehyde per mole of furfuryl alcohol. More preferably, the molar ratio of furfuryl alcohol to formaldehyde is in the range of at least about 1:2.50 to 1:3.50. The reaction is catalyzed with an organic acid and conducted at an elevated temperature, say at a temperature of about 110° C. to 130° C., and a pH of about 4.00 to 4.50. The formaldehyde can be employed in various forms, such as paraformaldehyde.

Under these conditions the reaction of furfuryl alcohol and formaldehyde is conducted at a controlled rate for a period of say 4.0 to 9.0 hours. During the reaction period the reaction progress is followed by the decline in the free furfuryl alcohol content of the reaction mixture. The reaction is allowed to continue at an elevated temperature until the furfuryl alcohol content has been reduced to the desired level of not more than about 10% by weight, preferably less than about %5 by weight, and more preferably less than 0.2% by weight of the reaction mixture. When the desired low level of free furfuryl alcohol has been achieved, the reaction mixture is cooled rapidly, such as by immersing in an ice bath, to room temperature (approximately 70° F.) to stop the reaction. During the cooling down period and when the temperature has dropped to about 70° F. or below a sample of the product resin is taken from the reaction mixture for determination of the free formaldehyde content. A formaldehyde scavenger such as melamine or urea or the like is then added to react with the free or unreacted formaldehyde in the reaction mixture. The scavenger is added in a molar quantity sufficient to react with the free formaldehyde in the reaction mixture and is added at or below room temperature. Typically, the mixture is then stirred for 1 to 2 hours so that the reaction of the scavenger with the free formaldehyde is substantially complete. An exotherm is observed which is indicative of reaction of the scavenger with the free formaldehyde. Preferably, the formaldehyde scavenger is added in an amount to reduce the final free formaldehyde content of the reaction mixture to less than about 0.5% by weight thereof. The resulting resin can, if a non-acidic resinous binder is desired, be neutralized with a base such as ammonium hydroxide or sodium hydroxide. Generally, curing reactivity is higher when the resin is not neutralized at the end of the reaction to a pH substantially higher than 4.5.

A weak organic monomeric or polymeric carboxylic acid having a pKa of not less than about 4, such as acetic, propionic, butyric, succinic, adipic and the like, is used as a catalyst in an amount of about 1 to 10% by weight of the furfuryl alcohol and an alkali such as sodium hydroxide is utilized to maintain the reaction pH in the range of about 4.0 to 4.5. Adipic acid is a preferred acid catalyst.

The resinous binder compositions of this invention are characterized by exhibiting very high compatibility with water and when diluted with an excess amount of water 90% or more, preferably at least 95%, of the resin is soluble in the water. For example, when 5 grams of resin is added to 95 grams of water, at least 4.5 grams of the resin is soluble in the water. The high water compatibility of the resinous compositions is advantageous in that undesirable amounts of resin need not be discarded prior to use as a binder and greatly improved resin distribution on a composite substrate can be achieved with the resins having high water compatibility.

As used herein, the term "Water Insolubles" means the amount of residue (or solids) which settles out, after standing at least 8 hours in water, when 5.0 grams resin is added to 95.0 grams deionized water. The percentage of water insolubles can be calculated by the formula:

$$\% \text{ Water Insolubles} = \frac{\text{Weight of Residue}}{5.0 \text{ grams resin}} \times 100\%$$

As used herein the term "Water Compatibility" means the amount of resin that is soluble, after standing at least 8 hours in water, when 5.0 grams of resin is added to 95.0 grams deionized water. The percentage of water compatibility can be calculated by the formula:

$$\% \text{ Water Compatibility} = \frac{5.0 \text{ grams resin} - \text{weight of residue}}{5.0 \text{ grams resin}} \times 100\%$$

As can be seen, there is an inverse relationshiup between water compatibility and water insolubles—the lower the amount of water insolubles, the greater the water compatibility.

The following specific examples further illustrate the invention.

EXAMPLE 1

This example illustrates the preparation of a preferred resinous binder composition of the invention using 2.75 moles of formaldehyde per mole of furfuryl alcohol, 656 pounds furfuryl alcohol (6.69 pound-moles), 600 pounds paraformaldehyde (91–93% purity; 18.4 pound-moles), 2.82 pounds sodium hydroxide (50% aqueous) and 102.1 pounds propionic acid were charged to a 350 gallon reactor. The reaction mixture was heated to 114°–119° C. under atmospheric pressure and held 8.3 hours until the furfuryl alcohol content had been reduced to 0.64%. The product was then rapidly cooled to 27° C. and about 371 pounds of of urea solution (50% aqueous) was added which is one equivalent based on the 13.7% by weight of the free formaldehyde as analyzed. After urea addition the mixture was mixed for one hour and then filtered through a 50 micron filter. An analysis of the prouct resin is given in Table 1.

EXAMPLE 2

This example illustrates the preparation of a furfuryl alcohol-formaldehyde resin according to the invention, with the resin being neutralized with ammonium hydroxide. 108 pounds furfuryl alcohol (1.10 pound-moles), 100 pounds paraformaldehyde (91–93% purity; 3.07 pound-moles), 0.5 pound sodium hydroxide (60% aqueous) and 16.9 pounds propionic acid were charged to a 50 gallon reactor. The reaction mixture was then heated to 116°–125° C. under slight pressure and held until the furfuryl alcohol content had been reduced to 0.65% (this took 4 hours). The product was then cooled to 85° C. and 22 pounds of urea solution (50% aqueous) was added which is one equivalent based on the estimated formaldehyde content. This was mixed for one hour, cooled to 30° C. and 42 pounds of ammonium hydroxide solution (28% aqueous) was added to neutralize to pH of 7.2. An analysis of the resin is given in Table 1.

EXAMPLE 3

This example illustrates the present invention wherein a 3.5 mole ratio of formaldehyde to furfuryl alcohol was utilized. 686.6 grams furfuryl alcohol (7.0 moles), 800.5 grams paraformaldehyde (91–93% purity; 24.5 moles), 3 grams sodium hydroxide pellets and 109 grams propionic acid were charged to a 3 liter flask. The reaction mixture was then heated, with stirring, to 116° C. and held until the furfuryl alcohol had been reduced to 0.5%. The product was then rapidly cooled to room temperature (22° C.). An analysis of this resin is given in Table 1.

EXAMPLE 4

This example illustrates the preparation of a furfuryl alcohol-formaldehyde resin following the techniques in the prior art, such as in Canadian Patent No. 1,200,336. In this example a high molecular ratio of formaldehyde to furfuryl alcohol according to the present invention was not employed. 991.6 grams furfuryl alcohol (10.1 moles), 412.5 grams paraformaldehyde (91–93% purity; 12.0 moles), 40.1 grams glacial acetic acid and 144.1 grams water were charged to a 3 liter flask. The reaction mixture was then heated, with stirring, to reflux (100° C.) and held for approximately four hours until the viscosity reached 60 centipoise at 25° C. as measured by Brookfield viscometer.

The product, at this point, was split into two portions. One portion (506.4 grams) resin at 60 centipoise viscosity was vacuum stripped up to a temperature of 140° C. at 60 millimeters of mercury vacuum. 345.9 grams product was obtained. An analysis of the product is given in Table 1.

EXAMPLE 5

The 60 centipoise viscosity intermediate (second portion) from Example 4 was also advanced to lower the furfuryl alcohol content by reacting further rather than vacuum stripping. Thus, 136.4 grams resin at 60 centipoise viscosity was refluxed an additional two hours (100° C.) to give 131.2 grams product. Analysis of this product is given in Table 1.

TABLE 1

|  | Resin Example 1 | Resin Example 2 | Resin Example 3 | Resin Example 4 | Resin Example 5 |
|---|---|---|---|---|---|
| Mole Ratio* | 2.75:1 | 2.75:1 | 3.5:1 | 1.25:1 | 1.25:1 |
| NH$_4$OH Neutralized | No | Yes | No | No | No |
| Water %** | 20.2 | 27.3 | 6.0 | 0.1 | 8.1 |
| Furfuryl Alcohol % | 0.35 | 0.28 | 0.5 | 8.9 | 8.2 |
| Formaldehyde % | 2.8 | 0.0 | 20.0 | 17.4 | 8.1 |
| Water Compatibility % | 98.4 | 99.9 | 100.0 | 58.7 | 46.3 |
| Water Insolubles % | 1.6 | 0.1 | 0.0 | 41.3 | 53.7 |
| Viscosity, cps, 25° C. | 435 | 275 | — | 6800 | 885 |
| pH | 4.0 | 6.3 | 3.5 | 3.1 | — |

*Mole Ratio of Formaldehyde to Furfuryl Alcohol
**Percentage of water inherently present in the resin.

Resin compositions of the invention have been tested for their curing reactivity by Dynamic Mechanical Analysis (DMA).

In Dynamic Mechanical Analysis a viscoelastic material is stressed and then released. This results in a mechanical oscillation at a resident frequency characteristic of the material being tested. Some of this energy is dissipated (lost to heat) or damped and the amplitude of oscillation decreases. In the Dynamic Mechanical Analysis an amount of energy, equal to that dissipated, is added to each cycle to maintain constant amplitude. The make-up energy is a direct measure of sample damping. As a sample is heated through a temperature program, this damping is affected by the cure. The damping is constant up to when the curing starts. As the resin cures, the damping changes up to the point when curing is completed when it becomes constant again. Therefore, the Dynamic Mechanical Analysis gives the temperature where the cure starts and the temperature where cure is completed.

The results of testing by Dynamic Mechanical Analysis are shown in Table 2.

TABLE 2

|  | Resin of Example 1 | Resin of Example 2 | Resin of Example 5 | Low VOC Phenolic |
|---|---|---|---|---|
| Reactivity (DMA) (Cure; °C. start/°C. finish) | 100° C./ 140° C. | 140° C./ 190° C. | 95° C./ 145° C. |  |
| VOC Emissions |  |  |  |  |
| Furfuryl Alcohol | 500 ppm | 3100 ppm | 5000 ppm | — |
| Formaldehyde | 800 ppm | 0.0 ppm | 500 ppm | 3500 ppm |
| Bis-hydroxymethyl furan | 0.0 ppm | 27000 ppm | 0.0 ppm | — |
| Phenol |  |  |  | 2500 ppm |
| Others |  |  |  | 600 ppm |

The resin binder compositions of this invention can be diluted with water and applied in accordance with known manufacturing procedures and the substrate having the binder applied thereto subjected to heat so as to cure the binder into a rigid thermoset condition. Generally temperatures on the order of 250° to 450° F. are sufficient to cure the resinous binders. Curing catalysts such as those described in a paper by Goldstein and Dreher, "Stable Furfuryl Alcohol Impregnating Solutions," Ind. Eng. Chem., Vol. 52, No.1, January 1960, p.58, and the like can be utilized to accelerate curing of the binder as is known in the art. Examples of such catalysts are cadmium nitrate, cobalt nitrate, nickel nitrate, zinc nitrate, ammonium nitrate, ammonium chloride, aluminum sulfate, copper sulfate, ammonium sulfate, malic acid, citric acid, tartaric acid, malonic acid, maleic acid, oxalic acid, chloroacetic acid and salicylic acid.

Even strong acids such as toluenesulfonic acid, benzenesulfonic acid, dichloroacteic acid, trichloroacetic acid, phosphoric acid, etc. can be used to cure these resinous binders in systems that are not heat cured.

Those modifications and equivalents which fall within the spirit of the invention are to be considered a part thereof.

What is claimed is:

1. A process for producing a liquid resinous composition heat curable to a set condition which comprises reacting in the presence of a weak acid having a pKa of not less than about 4 at an elevated temperature furfuryl alcohol with formaldehyde in a molar ratio of at least about 1:2 and recovering the liquid resin reaction product containing not more than 10% by weight of water-insoluble material and not more than about 10% by weight of furfuryl alcohol.

2. A process according to claim 1 wherein the molar ratio of furfuryl alcohol to formaldehyde is at least about 1:2.75.

3. A process according to claim 1 wherein the molar ratio of furfuryl alcohol to formaldehyde is at least about 1:3.50.

4. A process according to claim 1 wherein prior to recovery of the reaction product, a formaldehyde scavenger, is introduced into the reaction mixture to react with free formaldehyde.

5. A process according to claim 4 wherein the formaldehyde scavenger is urea.

6. A process according to claim 1 wherein prior to recovery of the reaction product a base is introced into the reaction mixture to achieve recovery of a resin of substantially neutral pH.

7. A process for producing a liquid resinous composition heat curable to a set condition which consists essentially of mixing together furfuryl alcohol and formaldehyde in a molar ratio of at least 1:2, adjusting the initial pH of the mixture to a least about 4.0, reacting the mixed furfuryl alcohol and formaldehyde at an elevated temperature in the presence of a weak organic acid having a pKa of at least about 4 for a time sufficient to reduce the furfuryl alcohol content of the reaction product to a predetermined low level and recovering a liquid resinous composition containing not more than about 10% by weight of furfuryl alcohol and not more than 10% by weight of water-insoluble material.

8. A process in accordance with claim 7 wherein the reaction is conducted for a time sufficient to reduce the furfuryl alcohol content of the reaction product to not more than about 5% by weight.

9. A process in accordance with claim 7 wherein the reaction is conducted for a time sufficient to reduce the furfuryl alcohol content of the reaction product to not more than about 0.2% by weight.

10. A process in accordance with claim 7 wherein the molar ratio of furfuryl alcohol to formaldehyde is at least about 1:2.5.

11. A process in accordance with claim 7 wherein the molar ratio of furfuryl alcohol to formaldehyde is at least about 1:3.50.

12. A process in accordance with claim 7 wherein prior to recovery of the reaction product a formaldehyde scavenger is added to the reaction mixture to react with free formaldehyde.

13. A process in accordance with claim 12 wherein the formaldehyde scavenger is urea.

14. A process in accordance with claim 7 wherein prior to recovery of the reaction product a base is introduced into the reaction mixture to achieve recovery of a resin of substantially neutral pH.

15. The process of claim 14 where the base is ammonium hydroxide.

* * * * *